Sept. 1, 1942.　　　M. BRESSLER　　　2,294,445
REFLEX CAMERA
Filed May 1, 1940　　　2 Sheets-Sheet 1
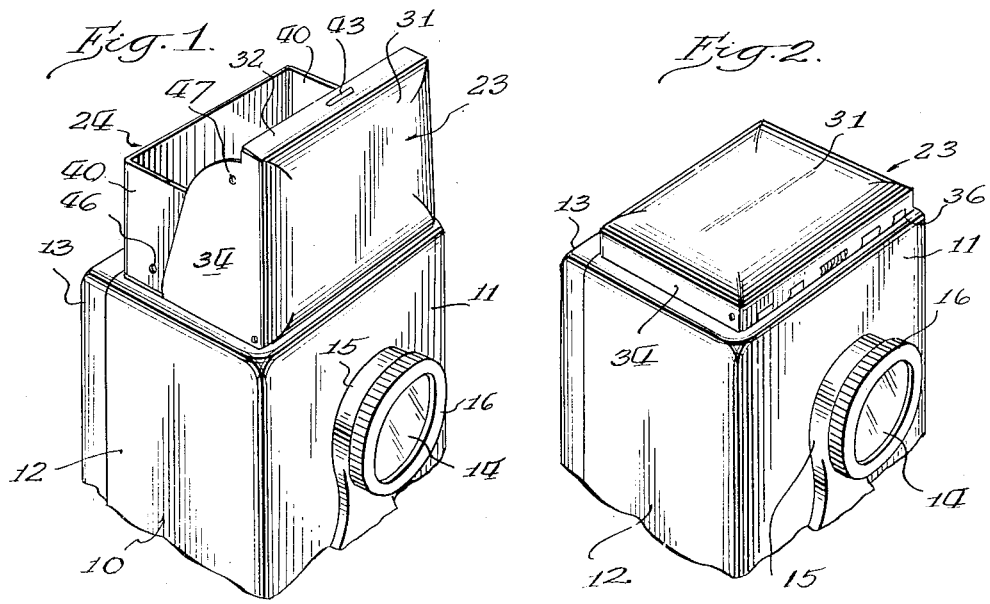
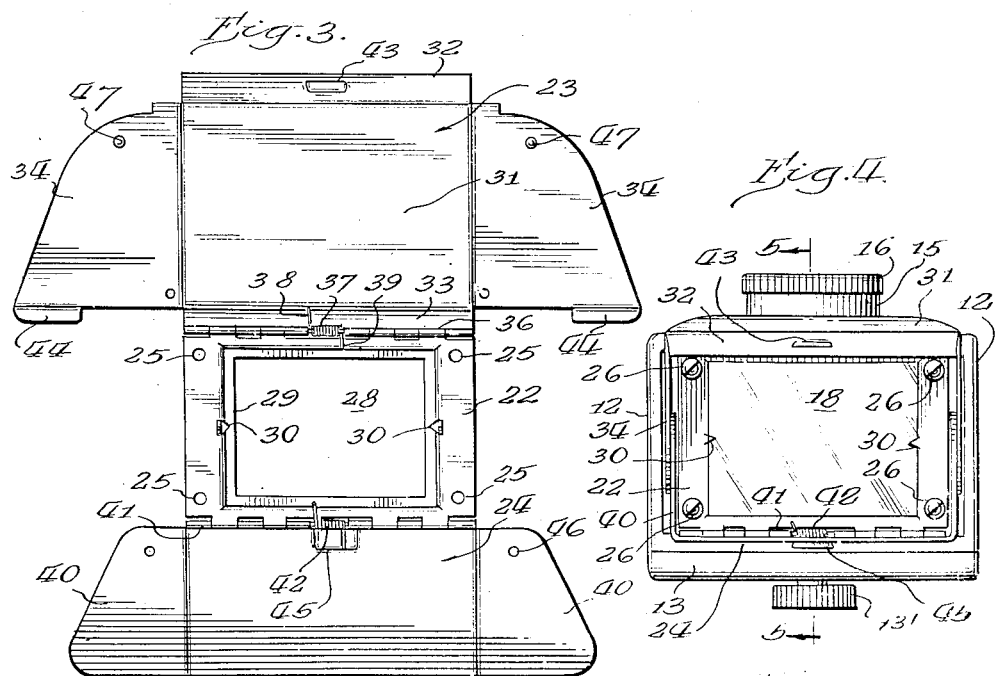

Sept. 1, 1942.　　　M. BRESSLER　　　2,294,445
REFLEX CAMERA
Filed May 1, 1940　　　2 Sheets-Sheet 2
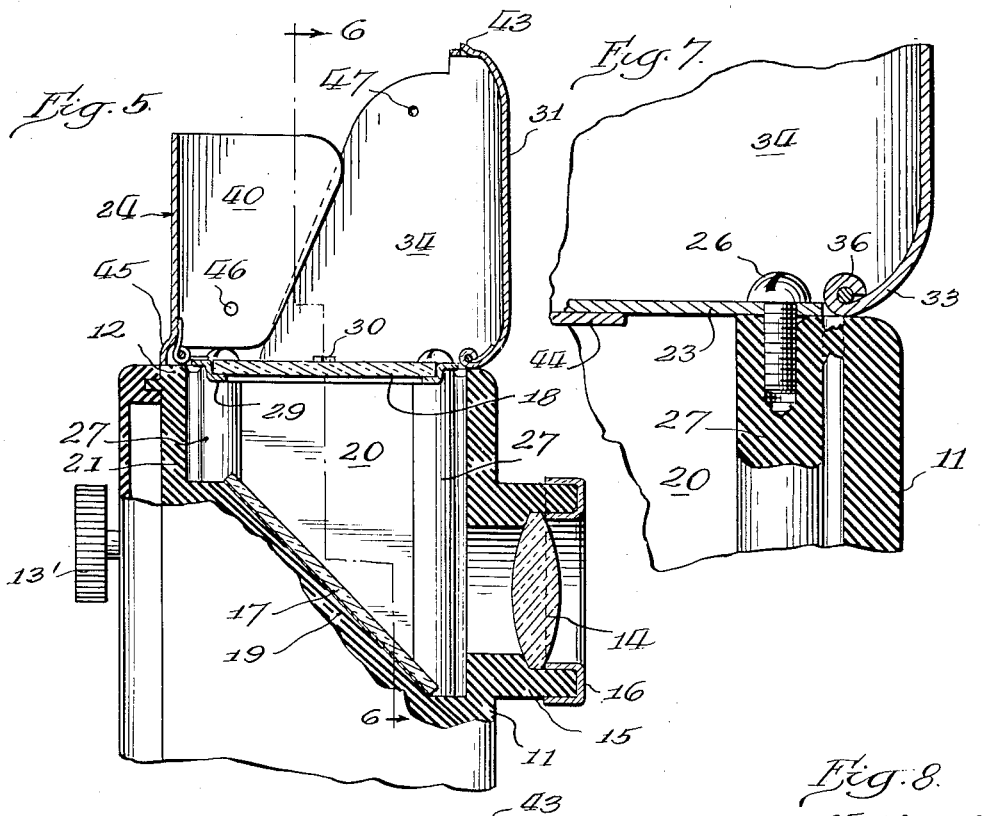
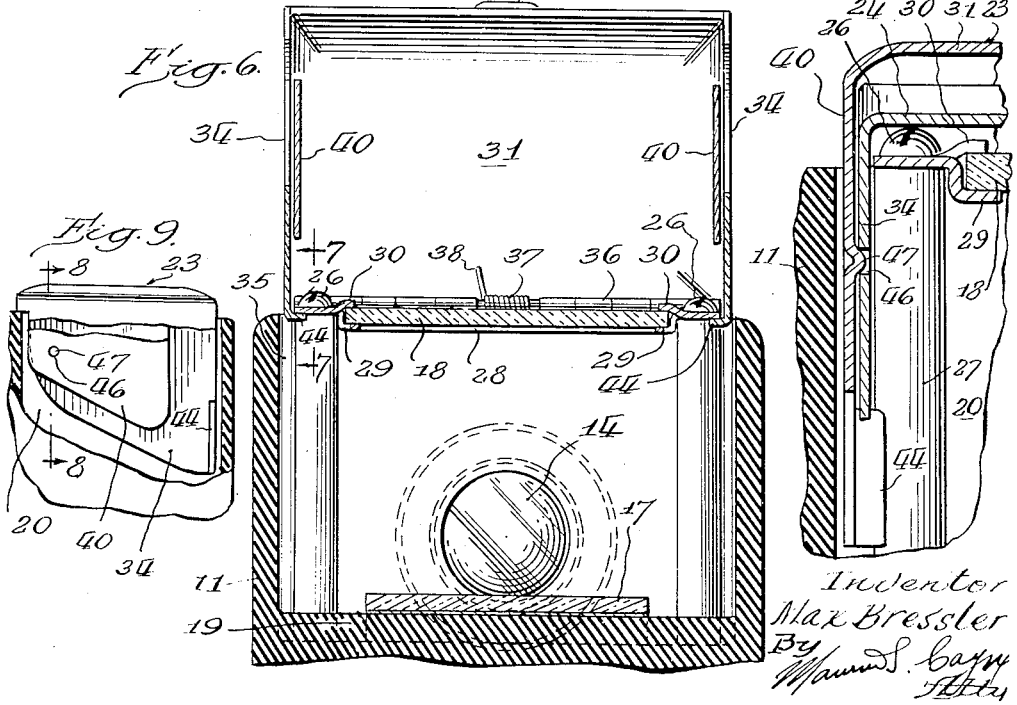
Inventor
Max Bressler
By Patented Sept. 1, 1942

2,294,445

UNITED STATES PATENT OFFICE 2,294,445

REFLEX CAMERA

Max Bressler, Chicago, Ill.

Application May 1, 1940, Serial No. 332,767

3 Claims. (Cl. 88—1.5)

This invention relates generally to a camera and more specifically to a hood and view finder for a reflex type of camera in which the image to appear on the finished print can be seen by the operator.

The camera contemplated is of the type known as the twin lens reflex in which one lens constitutes a portion of the optical trained for projecting the image upon the film within the camera, and the second lens is an independent lens to one side of the first mentioned lens for projecting substantially the same image on the ground glass view finder. However, the invention is readily adaptable for use in single-lens cameras in which the view finder lens and photograph projection lens are the same.

The invention primarily lies in a novel folding hood adapted to shield the ground glass from light to permit accurate adjustment of the camera, and hence the primary object of the invention is to provide such a hood in combination with a device of the character described.

A further object of the invention is to provide in combination with a device of the character described a view finder including a novel hood adapted to completely fold into the body of a camera and remain in closed position therein.

A further object of the invention is to provide, in combination with a camera of the character described, a view finder including a hood having novel means for maintaining same in an open position.

A further object of the invention is to provide in combination with a camera of the character described a view finder including a hood having novel and improved means for adjusting same from a closed to an open position and vice versa.

Still a further object of the present invention is to provide a new article of manufacture comprising a hood adapted to be affixed to a reflex type camera by simple and efficient means.

Still a further object of the present invention is to provide in a device of the character described a view finder having novel means for effectively and simply associating a ground glass member therewith.

Still a further object of this invention is to provide in a device of the character described, a novel hood construction for the view finder thereof, said construction including novel and improved means for aiding in the closing of said hood.

Still a further object of the invention is to provide in a device of the character described a hood and view finder comprising a small number of simple parts, efficiently associated and assembled and adapted for economical manufacture in large quantities.

A further object of the invention is to provide a novel and improved view finder hood formed entirely of sheet metal stampings advantageously associated.

With the foregoing and other objects in view which will appear as the description proceeds, the invention consists in certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a camera having my invention associated therewith, the hood thereof being in an open position.

Fig. 2 is a similar view of the camera with the hood in a closed position.

Fig. 3 is a completely developed view of the hood and ground glass frame member.

Fig. 4 is a top plan view of the camera with the hood in an open position.

Fig. 5 is a sectional view through the camera taken generally along the line 5—5 of Fig. 4.

Fig. 6 is a sectional view of the camera with the hood in an open position taken generally along the line 6—6 of Fig. 5.

Fig. 7 is a fragmentary sectional view taken generally along the line 7—7 of Fig. 6.

Fig. 8 is a fragmentary sectional view taken generally through the line 8—8 of Fig. 9, the hood being in a closed position.

Fig. 9 is a side elevational view of the camera with the hood in a closed position and with portions broken away to show the association of various parts of the hood.

The reference character 10 designates generally the body of the camera having a front wall 11, side walls 12 and a rear cover member 13 held in position by the thumb screw 13'. Said camera may be of any convenient size or shape and may be of any operational type. The type shown in the drawings is a simple form and is merely for the purpose of illustration. The camera illustrated generally comprises a hollow container formed by said walls 11 and 12 covered on the side opposite to the said wall 11 by the cover-member 13. The top of the container is left open for a purpose to be presently described.

The front wall 11 of the camera is provided with a view finding lens 14, disposed in a housing 15 integrally formed with the wall 11 and held in place by a ferrule 16. It is to be understood that while the view finding lens 14 is shown optically independent of any other portion of the camera, as is usually the case with the so-called twin lens reflex cameras, my invention is applicable as well to single lens reflex cameras in which the view finding lens and the protographing lens are one and the same. The primary difference between the two types of cameras is that in the single lens camera the hood permitting the operator to perceive the image must be closed prior to operation of the shutter. In the twin lens reflex the optical systems are independent and hence the hood may remain open at all times.

The light rays from the objective enter the camera 10 through the view finding lens 14 and impinge upon an inclined mirror 17 disposed at an angle of 45° to the horizon within the camera. The rays are reflected by means of said mirror 17 to the ground glass plate or image screen 18 disposed in the top of the camera. By means of this optical arrangement, it is possible to view on the ground glass plate or screen 18 an image of the objective at which the camera is pointing, assuming, of course, that the axis of the view finding lens 14 and that of the optical train constituting the photographic portion of the camera are parallel.

The inclined mirror 17 is glued or in other manner fixed to an inclined partition 19 which separates the upper portion of the camera from the rest of the camera, thus forming a chamber or compartment 20 in the upper end of the camera. By means of a continuation 21 of the partition 19 to the rear of the chamber 20 said chamber is provided in effect with four walls one of which constitutes the front wall 11, one of which is the foreshortened rear wall 21 and the two side walls 12.

It is thus seen that the chamber 20 is independent from any other portion of the camera, both optically and physically. The upper portion of the chamber 20 is open to permit association of a hood and the ground glass plate or screen 18 therewith.

In order to properly view the image formed upon the ground glass screen 18, it is necessary to shield said glass or screen from any reflected light. It is customary to provide a hood surrounding said ground glass to permit the operator of the camera to see a clear image thereupon when he looks down into the camera. I have provided a novel collapsible hood for this purpose which is simple in construction and efficient in operation. Said hood may be closed into the upper portion of the camera when same is not in operation as shown in Fig. 2 or may be open for use as shown in Fig. 1.

The hood consists of three hingedly connected members 22, 23 and 24. The member 22 is a rectangular sheet metal stamping having openings 25 in its corners for the accommodation of screws or the like 26 by which the member 22 may be attached to the camera and fixed in the open end of the chamber 20 resting upon the upper edges of the walls 12, 12, 11 and 21. For this purpose, the compartment 20 is provided with a plurality of columns or posts 27 extending longitudinally thereof and integrally formed with the body of the camera. Said columns or posts 27 are provided at their upper ends with threaded openings for the accommodation of said screws 26.

Centrally of the rectangular member 22, an opening 28 is provided, said opening being rectangular in shape and corresponding to the form of the ground glass plate 18. The edges of said opening 28 are struck downward as at 29 so that the ground glass plate 18 may be accommodated therein in a framing effect. A pair of prongs 30 are struck outward from the body of the member 22 and when the ground glass plate or screen 18 is positioned within the frame 29, said prongs 30 are bent over upon said ground glass plate or screen and serve the purpose of holding the same in position.

When said member 22 is fixed within the upper end of the compartment 20 there is provided between the side walls 12 and the side edges of the member 22 a space 35 for a purpose to be described.

The member 23 consists of a shallow tray-like portion having a top wall 31 front and rear edge walls 32 and 33 respectively and side walls 34. Said side walls or wings 34 extend considerably outward from the top portion 31 and are adapted to extend into the space 35 provided between the side walls 12 and the side edges of the member 22. It will be noted in Fig. 6 that the posts or columns 27 are spaced from the side walls 11 to permit the wings 34 to rotate into the compartment 20 as will be explained. The rear wall 33 of the member 23 is hingedly attached at 36 to the member 22 and is urged away from said member 22 by a coiled spring 37 having one end 38 thereof engaged against the side wall 33 and the other end 39 thereof engaged against the member 22. The member 24 comprises a plate-like member formed as a sheet metal stamping and having a pair of wings 40 also adapted to rotatively enter said space 35 between the walls 11 and the edges of the member 22. Said member 24 is hingedly attached to the member 22 as at 41 and is provided with a coiled spring 42 which normally urges the same outward away from the member 22.

Each of the members 22, 23 and 24 is formed, as explained, from sheet metal stampings so that each member is a single integral unit bent to its proper shape and configuration, as illustrated in Figs. 1 and 2.

In assembly the member 24 of the hood is arranged to fold inwardly of the member 23 so that when the camera is being closed, first the member 24 is folded downward to the right as viewed in Fig. 5 and then the member 23 is folded downward to the left as viewed in Fig. 5 resulting in the closed position shown in Fig. 2 and in Fig. 9. In this position the wings 34 and the wings 40 have both entered the compartment 20 via the space 35 and are held in position therein.

In order to facilitate opening of the device, an outwardly struck projection 43 is provided on the wall 32 of the member 23. This permits the operator to grasp the member 23 with his fingernail preparatory to opening the same. The base of the wings 34 are provided with perpendicular bent portions 44 which are disposed below the member 22 in assembly of the device. Thus such portions 44 will engage the bottom of the member 22 as the hood is opened and prevents motion of the member 23 further than perpendicular to the top of the camera. If said portions 44 are not used, as may be desired, clockwise motion of the member 23 may be limited either by frictional engagement of wings 34 with wings 40, or by engagement of the wall 33 with the top edge of the wall 11.

The base of the member 24 is provided with an outwardly struck lug 45 as best shown in Fig. 5 which engages against the top of the wall 21 when the hood is in an open position. This prevents the member 24 from moving further than to a perpendicular position with respect to the top of the camera. When both of the members 23 and 24 are open, the side walls or wings 34 and 40 thereof cooperate along with the portions 31 and 24 to produce an effective rectangular hood completely surrounding the ground glass plate 18.

Assuming the device to be in an open position, if it is desired to close the same, the operator presses the member 24 forward, or to the right, as shown in the Fig. 5, causing the same to revolve about its hinge 41 against the pressure of the spring 42. Said member 24 will revolve in a clockwise direction until the edges of the wing portions 40 begin to enter the space 35. Then the said edges will engage the portions 44 of the wings 34 and as the member 24 is caused to continue to revolve the member 23 will be caused to move downward or to the left as viewed in Fig. 5 in a counter-clockwise direction about its hinge 36 into the space 35 against the pressure of the spring 37. With the member 23 partially moved, or moving, to a closed position, it is a simple matter for the operator to conclude the folding of the hood and the consequent moving of the member 23 to a position shown in Figs. 2, 8 and 9. The wings 40 are each provided with a small opening 46 which is adapted to cooperate with inwardly struck projections 47 formed on the wings 34. When the device is moved, as has been explained, to a closed position, the projections 47 will move to snap into the openings 46 in the position shown in Fig. 8, thus maintaining the device in a closed position.

It will be seen that the device I have provided is constructed in a simple effective manner in view of the fact that members 22, 23 and 24 are each formed of sheet metal stamping of simple shape and form. It should be appreciated that my device is applicable to any type of camera and may be effectively used either with twin lens reflex cameras or with single lens reflex cameras, inasmuch as the hood thereof may be almost instantaneously opened and closed with a minimum of effort on the part of the operator of the camera.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a camera, an optical train for projecting the image of an objective to one end thereof, a substantially rectangular frame-like member blocking said end and attached to said camera, a view finding screen fixed within said frame-like member and adapted to receive said projected image, a pair of cooperating substantially U-shaped members hingedly attached at opposite sides of said frame-like member and adapted to form a substantially perpendicularly disposed rectangular hood completely surrounding said view finding screen and stop means associated with said members for maintaining same in said substantially perpendicular arrangement, said stop means comprising a rear outwardly struck lug provided on the body of one of said U-shaped members adjacent the edge of hinged attachment and adapted to engage the top of the camera outside of the frame-like member, and a pair of inwardly bent projections, one formed on the edge of each of the arms of the second of said U-shaped members adapted to engage the underside of said frame-like member, said frame-like member having spring means urging each of said U-shaped members to said perpendicular disposition.

2. A new article of manufacture, a hood adapted to be fixed over the open end of a camera or the like, said hood comprising three hingedly connected members, each formed as a single sheet metal stamping, one of said members being substantially rectangular and adapted to be fixed into the open end of said camera or the like, the other two of said members each having a pair of side wing-like portions adapted to cooperate when said members are disposed perpendicular to the plane of said rectangular member to form two sides of a rectangular hood surrounding said rectangular member, the bodies of said members forming the other two sides of said hood, said rectangular member having means formed thereon for attaching a view finding screen thereto, said means comprising an outwardly struck supporting frame portion forming a seat for said screen, and outwardly struck portions for engaging said screen to hold same upon said seat and within said frame portion.

3. As a new article of manufacture, a hood adapted to be fixed over the open end of a camera or the like, said hood comprising three hingedly connected members, each formed as a single sheet metal stamping, one of said members being substantially rectangular and adapted to be fixed into the open end of said camera or the like, the other two of said members each having a pair of side wing-like portions adapted to cooperate when said members are disposed perpendicular to the plane of said rectangular member to form two sides of a rectangular hood surrounding said rectangular member, the bodies of said members forming the other two sides of said hood, the smaller of said members being foldable upon said rectangular member, the larger of said members being also foldable upon said rectangular member and being provided with upstanding walls adapted to completely conceal and enclose said smaller member and said rectangular member in said folded position, the said wings of said members having cooperating means associated therewith adapted to snap into engagement when said article is in said folded position to maintain said position, said snap means comprising cooperating inwardly struck projections and openings for engagement therewith provided on respective side wings of said members.

MAX BRESSLER.